(12) United States Patent
Liljevik

(10) Patent No.: US 6,283,425 B1
(45) Date of Patent: Sep. 4, 2001

(54) MOUNTING BRACKET

(75) Inventor: Tord Liljevik, Bromma (SE)

(73) Assignee: Allgon AB, Åkersberga (SE)

( * ) Notice: Subject to any disclaimer, the term of this patent is extended or adjusted under 35 U.S.C. 154(b) by 0 days.

(21) Appl. No.: 09/260,016

(22) Filed: Mar. 2, 1999

(30) Foreign Application Priority Data

Mar. 3, 1998 (SE) .................................................. 9800663

(51) Int. Cl.[7] .............................. A47B 96/06; E04G 3/00; F16B 1/00; G09F 7/18
(52) U.S. Cl. ..................... 248/230.4; 248/228.4; 248/229.23; 248/229.13; 248/218.4; 248/231.51; 248/316.5; 403/385; 403/399; 343/892
(58) Field of Search ............................ 248/230.4, 228.4, 248/229.23, 229.13, 218.4, 219.4, 231.51, 316.1, 316.5; 403/385, 398, 399; 24/522, 525, 514; 343/892

(56) References Cited

U.S. PATENT DOCUMENTS

| | | | |
|---|---|---|---|
| 3,787,015 | 1/1974 | Ablett | 248/43 |
| 3,920,295 | * 11/1975 | Speckin | 248/221 X |
| 4,616,797 | * 10/1986 | Cramer | 248/231.5 X |

FOREIGN PATENT DOCUMENTS

| | | |
|---|---|---|
| 2062544 | 9/1993 | (CA). |
| 4431692 | 8/1995 | (DE). |
| 0643247 | 3/1995 | (EP). |

OTHER PUBLICATIONS

Mounting Instructions 71005A, Allgon System AB.
Mounting Instructions 70690A1, Allgon Systems AB.

* cited by examiner

Primary Examiner—Leslie A. Braun
Assistant Examiner—A. Joseph Wujciak
(74) Attorney, Agent, or Firm—Jacobson Holman, PLLC

(57) ABSTRACT

A mounting bracket useful for securing a base, such as an antenna to a pole, a tube or a post, or a similar anchor support, and including a first clamp part, being a base clamp, to be secured to the base (the antenna) adapted to be locked against the pole, and a second clamp part, being tightening clamp, adapted to partly embrace the pole and to be tightened to the base clamp with the pole clamped therebetween, preferably by a screw-nut connection on each side of the pole. The tightening clamp, is formed with two elongated slots extending in the longitudinal direction of the clamp, a first slot of which may be closed and the second slot of which is open at the end of the clamp. The slots having a width matching the diameter of the clamp screws, a length which is at least twice the diameter of the clamp screws and arranged such that the open slot of the tightening clamp can be rotated freely past the corresponding bolt thereby engaging the corresponding clamp screw through the open end of the slot after the pole has been placed in contact with the base clamp. A tightening clamp and a base clamp can be joined in a rotational joint. Thereby an object, which is mounted, e.g. an antenna, can be panned.

14 Claims, 6 Drawing Sheets

MOUNTING BRACKET

FIELD OF THE INVENTION

The present invention relates to a mounting bracket, whereby is meant a clamp device by means of which an object, for instance an elongated object, an antenna etc, can be secured to a ground pole, a tube or a post, a ground anchored post or a similar anchoring support. The clamp device comprises a first clamp part adapted to be secured to the object to be mounted against the pole, and a second clamp part adapted to embrace the pole and to be tightened to the first clamp part, generally by means of a screw-nut connection means. The invention also relates to a mounting bracket, which alternatively can be used for panning the object if the second clamp part is mounted on a supporting structure such as a wall.

BACKGROUND OF THE INVENTION AND RELATED ART

The invention has basically been developed in connection to mounting of antennas, like a base station or repeater station antenna in a mobile telephone system, whereby said first clamp part is mounted on the antenna while on the ground, whereupon the antenna with the pole clamp mounted thereon is raised and is mounted against the pole or post, generally in a vertical position and on a predetermined level above the ground. A prior art method of mounting antennas in known from Allgon mounting instruction no 71005A and 70690A1, available on request to Allgon AB, Patents, P O Box 500, 184 25Å Akersberga, Sweden, and incorporated herein by reference.

In the following the invention will mainly be described in connection with mounting of antennas on poles. It is to be understood, however, that the invention is not restricted to antenna pole clamps, but that the invention is useful in many other situations and for many other purposes, in which there is a need of mounting an object against a pole or a post on a predetermined level above the ground.

When mounting an antenna it is generally necessary to foresee that the antenna elements are placed freely in the air and without any obstacles in front of said elements, often on a substantial distance above the ground. For practical reasons the antenna is generally mounted on a pole on the ground or a building. To this end a first part of a clamp device, a base clamp, is secured to the antenna, whereupon the antenna with the pole clamp to be mounted is raised in that the installation engineer climbs a ladder, or lifts himself by means of a lifting device, with the antenna in his hands, and he places the base clamp of the antenna clamp device against the pole. In order to connect the antenna against said pole the installation engineer has to place the separate second clamp part against the outer side of the pole, he has to pull clamp screws through bores of said first and second clamp parts, and he has to tighten nuts engaging said clamp screws thereby solidly fixing the pole with the antenna between said first and second clamp parts.

It is obvious that it is, in practice, very difficult or even impossible for a single installation engineer to provide such mounting of an antenna against a pole, and it is often necessary that the mounting is made by two installation engineers, one installation engineer carrying the antenna and the second installation engineer pulling and tightening the screw-nut joint between the two clamp parts.

SUMMARY OF THE INVENTION

The object of the invention has been to suggest a clamp device of the above mentioned type which is designed so that it is very well possible for a single installation engineer to mount the antenna against an antenna pole. The clamp device comprises a first clamp, the base clamp, adapted to be anchored against an antenna, a second clamp, the tightening clamp, adapted to be tightened against said first clamp by means of a screw-nut joint with the antenna pole there between. The clamps preferably are formed as U-shaped brackets (⊂ ⊃) which along the branches thereof are formed with U- or V-shaped pole guide grooves or recesses.

According to the invention the second clamp, the tightening clamp, is formed with two elongated slots at the intermediate side of said clamp and extending in the longitudinal direction of the clamp, a first slot which may be closed and a second slot which is open at the end of the clamp for passage of the mounting bolts. The screws for tightening of the clamps against the pole are formed so that said screws can not rotate in the first clamp, the base clamp. This is provided in that said screws are of carriage bolt type having square bolt parts adjacent the head thereof, which square bolt parts engage square bores of said base clamp. Alternatively said bolts can be welded or by other means secured to said base clamp.

When using the above mentioned clamp device the screws are pulled through the bores of the base clamp and through the closed slot of the tightening clamp, and nuts are loosely screwed onto the outer ends of the screws. Thereby the clamp devices forms an integral part in which the tightening clamp is hanging freely from the corresponding clamp screw, and the twin clamp device can simply be tightened by a single installation engineer using only one hand, whereby the antenna with the integral clamp device can be held by the second hand.

The tightening is accomplished in that the tightening clamp is moved in a direction so that the screw extending through the closed slot engages the inner end of said closed slot. In this position the second slot, which is open at the outer end thereof can be brought to engage the second screw, and the clamp is thereafter moved back so that the screws preferably engage closed ends of the slots, and the nuts can simply be tightened thereby clamping the tightening clamp against the pole and the base clamp.

By connecting the base clamp and the tightening clamp with a rotating joint, e.g. in the form of a hinge and fastening the tightening clamp to a supporting structure, such as a wall, it is achieved that the antenna can be panned, i.e. its rotational position in respect of its vertical longitudinal axis can be adjusted to a desired value.

By further arranging a locking member between the base clamp and the tightening clamp the antenna can be locked in a desired rotational position.

BRIEF DESCRIPTION OF THE DRAWINGS

Now the invention is to be described more in detail with reference to the accompanying drawings, in which

FIG. 8 shows a side view of the embodiment of FIG. 6. In

DESCRIPTION OF PREFERRED EMBODIMENTS

Figure 1:
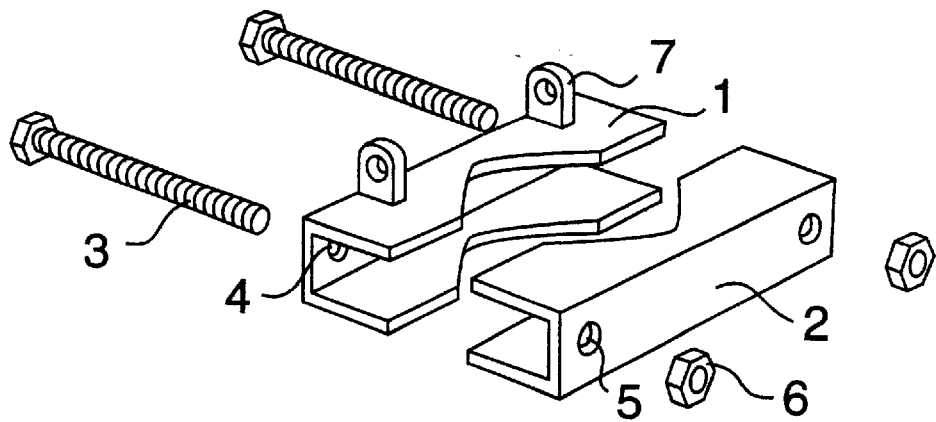
FIG. 1 is a perspective view of a clamp device of prior art type.

As mentioned above a prior art clamp device comprises a first clamp 1, a base clamp, adapted to be connected to a base, for instance an antenna (not illustrated), for instance by means of screws extending through bores of said first clamp, and adapted to engage an "inner" portion of a pole, a second clamp 2 adapted to engage an "outer" portion of a pole, and two screws 3 adapted to extend through bores 4 and 5 of clamp 1 and clamp 2, respectively and having nuts 6 for tightening the second clamp 1 to the first clamp 2 thereby fixedly mounting the base (antenna) to a pole. Preferably the base clamp 1 can be formed with two lugs 7 or two holes 11 by means of which an antenna can be mounted, for instance tiltable, in relation to the base clamp, of by means of which a coupling box, or a similar means can be connected to the clamp device.

The clamp device according to the invention is basically of the same type as said prior art clamp device shown in FIG. 1.

Figure 2:
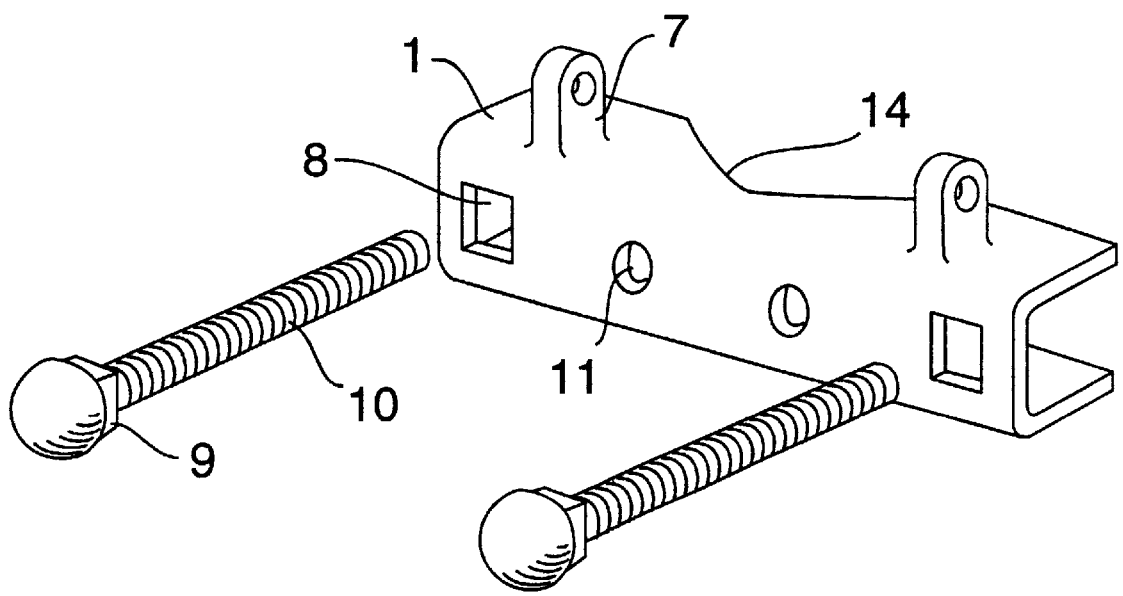
FIG. 2 shows a first clamp part, a base clamp, according to the invention in combination with connection screws.

The clamps 1 and 2 are formed as U-shaped brackets having branches and an interconnecting side. In the base clamp according to the invention, which is shown in FIG. 2 the bores 8 are square and are matching a square portion 9 of a carriage bolt 10 foreseeing that the bolt 10 can not rotate after the square portion 9 thereof has been brought to engage the square bores 8. Alternatively, as mentioned above, the bolts can be welded or otherwise secured to the base clamp 1. In FIG. 2 is also shown that said base clamp 1 can be formed with through bores 11 for screw connecting antennas or similar, as an alternative to lugs 7.

Figure 3:
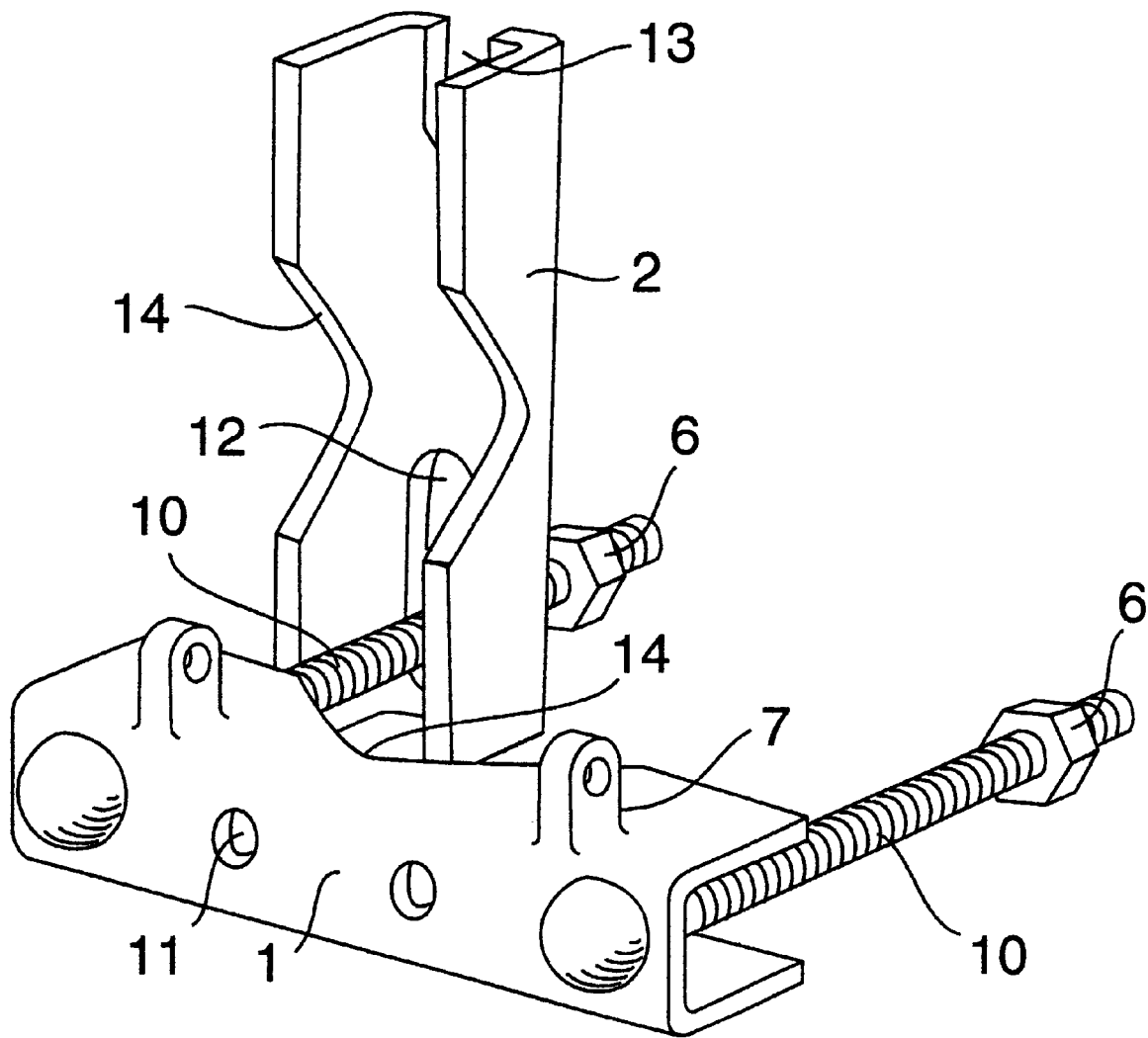
FIG. 3 is a perspective view showing the way of pre-mounting the clamp device to form an integral unit before screw mounting the base clamp to the base.

In FIG. 3 is illustrated that the tightening clamp 2 is formed with two elongated slots, a first slot 12 which is closed at both ends and a second slot 13 which is open at the outer end thereof. The two clamps preferably are formed with U-formed or V-shaped grooves 14 along the branches thereof for engaging a pole 15, and an interconnecting side having elongated slots 12 and 13. Said slots have a width which corresponds to, or is slightly wider than the diameter of the connection bolts 10 and a length which is at least twice the diameter of said bolts 10. For mounting reasons the closed slot 12 has to be longer than the open slot, preferably at least one bolt diameter longer than the open slot 13.

The clamp device preferably is pre-mounted, in factory or at the ground, to the object to be mounted, for instance an antenna, in that the bolts 10 are pulled through the two bores 8 of the base clamp 1, and one of said bolts is also pulled through the closed, elongated slot 12 of the outer clamp 2, named the tightening clamp, and in that nuts 6 are loosely screwed onto the outer ends of the two bolts 10.

Figure 4:
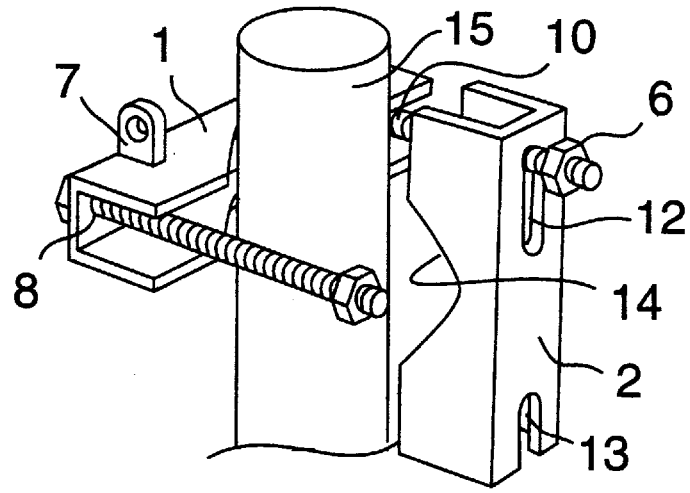
FIG. 4 shows a first stage of connecting the pole to the clamp device.
Figure 5:
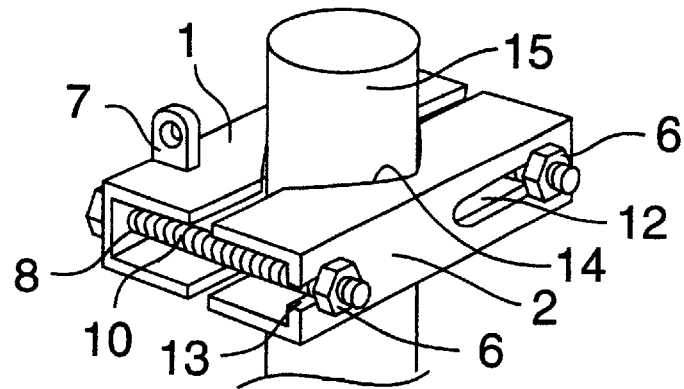
FIG. 5, shows the pole locked by the clamp device.

The way of mounting the antenna with the clamp device on the pole is illustrated in FIGS. 4 and 5. The base clamp 1 is screwed or otherwise connected to the base, e g the antenna. The tightening clamp 2 is hanging freely in the screw 10 extending through the closed slot 12, that is in the right bolt as shown in FIGS. 4 and 5 but can not be released therefrom since it is blocked by the nut 6.

The clamp device with the antenna (not shown) is mounted against the pole 15 by being moved horizontally into place against the pole with said pole located between the two bolts 10. The tightening clamp 2 is moved longitudinally so that the bolt 10 engages the inner, closed end of the elongated slot 12. In this position the tightening clamp 2 can be rotated clockwise past the left hand bolt 10 as shown in FIGS. 4 and 5, whereupon said second clamp 2 is moved back so that the bolt engages the closed outer end of the closed slot 12, whereby the second bolt 10 is in a position with the open slot 13 embraces same and the corresponding screw is positioned at or close to the bottom end of said slot 13. Now the two nuts can easily be tightened by one hand of the installation engineer, who holds the antenna with the clamp device with his second hand. FIG. 5 shows the antenna with the clamp device finally securely attached against the pole 15 using a clamp device according to the invention.

It is to be understood that the antenna necessarily has to be mounted by means of two, or more, spaced clamp devices of the same type as described above, and which clamp devices are mounted on different levels against the base (antenna).

Figure 6:
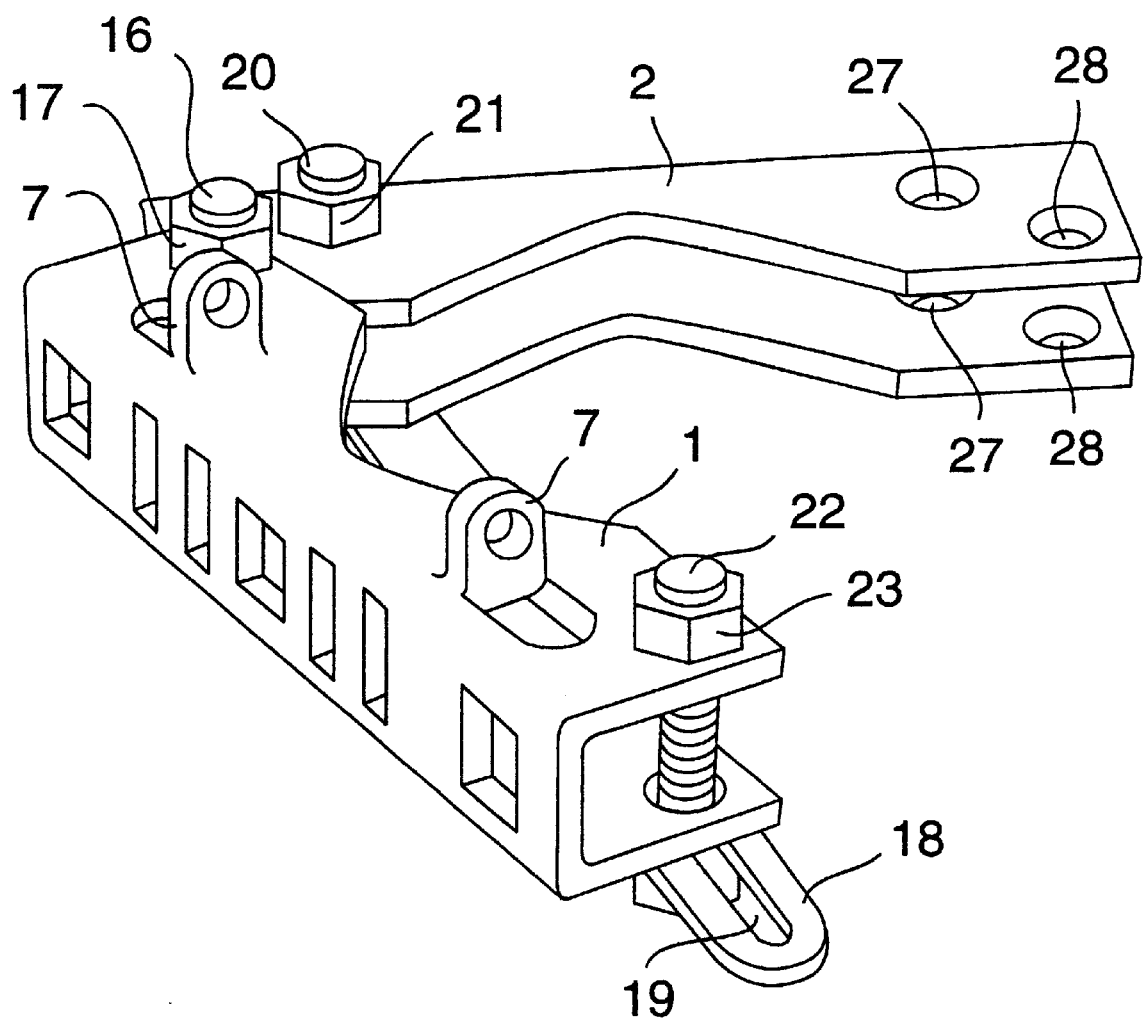
FIG. 6 shows a further embodiment of the invention in a perspective view.

In FIG. 6 a further embodiment of the invention is shown. A base clamp 1 and a tightening clamp 2 of the kind described above, are provided with holes in order to expand the possibilities of use of the mounting bracket. One pair of holes in the base clamp 1 and one pair of holes in the tightening clamp 2 are together with a screw 16 and nut 17 forming a rotary joint or a hinge, which allows the base clamp 1 and the tightening clamp 2 to be rotated in relation to each other around an axis defined by the screw 16. An arm 19 is arranged to be fastened to the base clamp 1 and the tightening clamp 2 by means of screws and nuts. At a first end (not shown) of the arm 18 a hole is provided for connection of the arm to the tightening clamp 2 by means of a screw 20, which also passes through two holes in the tightening clamp 2, and a nut 21. A slot 19 is provided at the second end of the arm 18. A screw 22 through the slot 19 and two holes in the base clamp 1 is tightened by means of a nut 23 for locking the arm to the base clamp 1. By tightening the screws 20, 22 and nuts 21, 23, the base clamp 1 and the tightening clamp 2 are locked in relation to each other, and rotation is prevented. By the arrangement of the slot 19 it is possible to adjust the desired angle between the base clamp 1 and the tightening clamp 2 before tightening the screws 20, 22 and nuts 21, 23, by letting the screw 22 slide in the slot 19.

Figure 7:
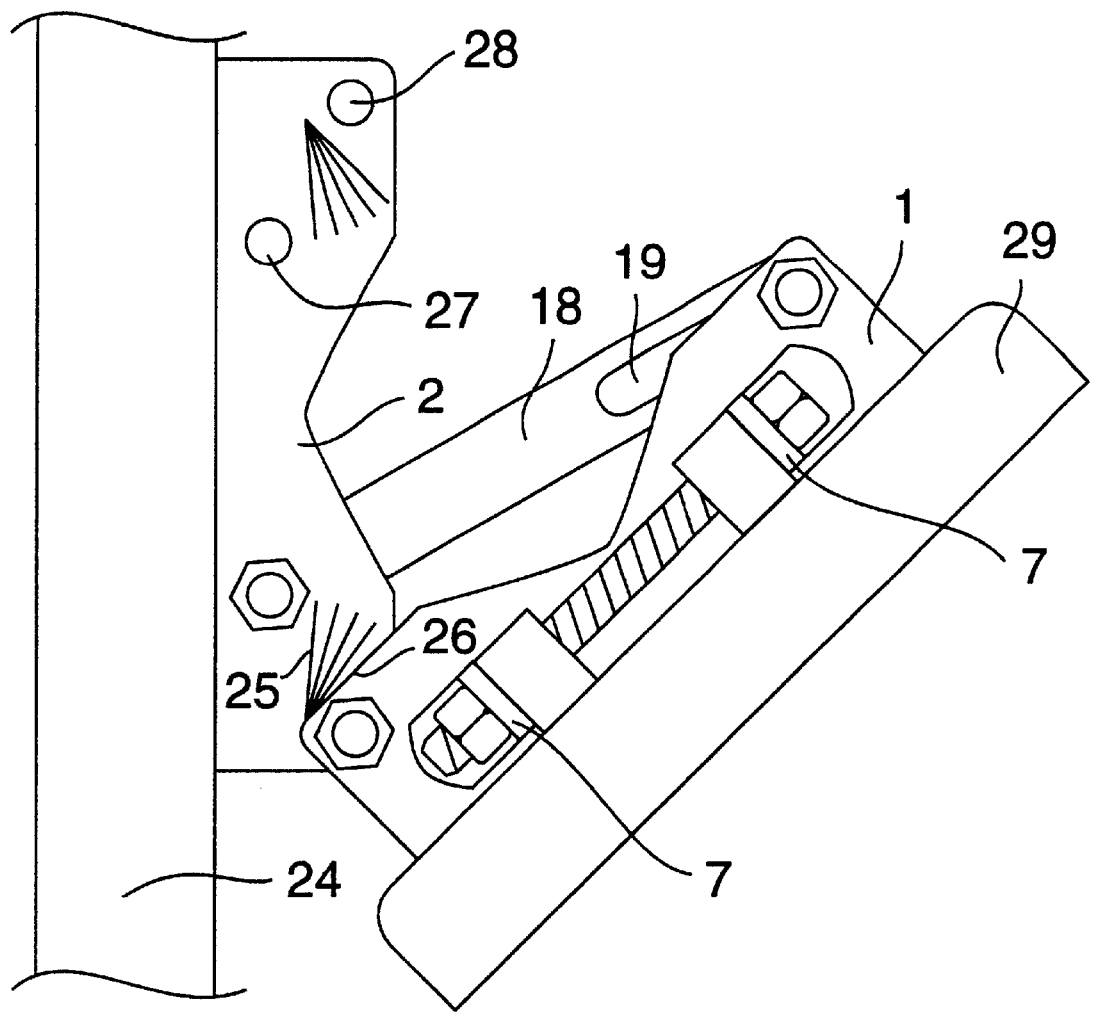
FIG. 7 shows a top view.

In FIG. 7 the embodiment of FIG. 6 is shown in a top view. Here the tightening clamp 2 is secured to a wall 24, by means of screws (not shown) through holes in the intermediate portion of the tightening clamp 2. The object to be secured, e.g. an antenna 29 is mount e d on the base clamp 1 as described above, e.g. by screws through the lugs 7. By the arrangement of this hinge and locking member, i.e. arm 18, an antenna can be panned, i.e. its rotational position in respect of its vertical longitudinal axis can be adjusted to a desired value. The tightening clamp 2 is further provided with a scale where the position of the edge 26 of the base clamp indicates the angle between the base clamp 1 and the tightening clamp 2. As shown, the holes in the base clamp 1 for the screws 16, 22 are symmetrical. Further additional holes 27, 28 are provided in the tightening clamp 2 as well as an additional scale. This enables the hinge to be moved to holes 28 and the holes for the screw 22, and the arm 18 to be connected to holes 27 and the holes in the base clamp for the screw 16. Hereby, the angle between the base clamp 1 and the tightening clamp 2 can be selected in another range.

Figure 8:
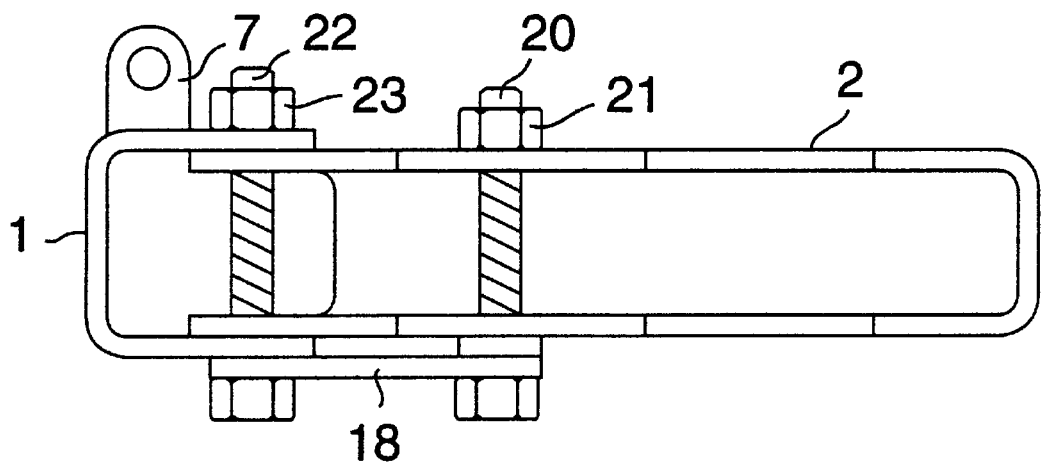

FIG. 8 shows the embodiment of FIGS. 6 and 7 in a side view.

Figure 9:
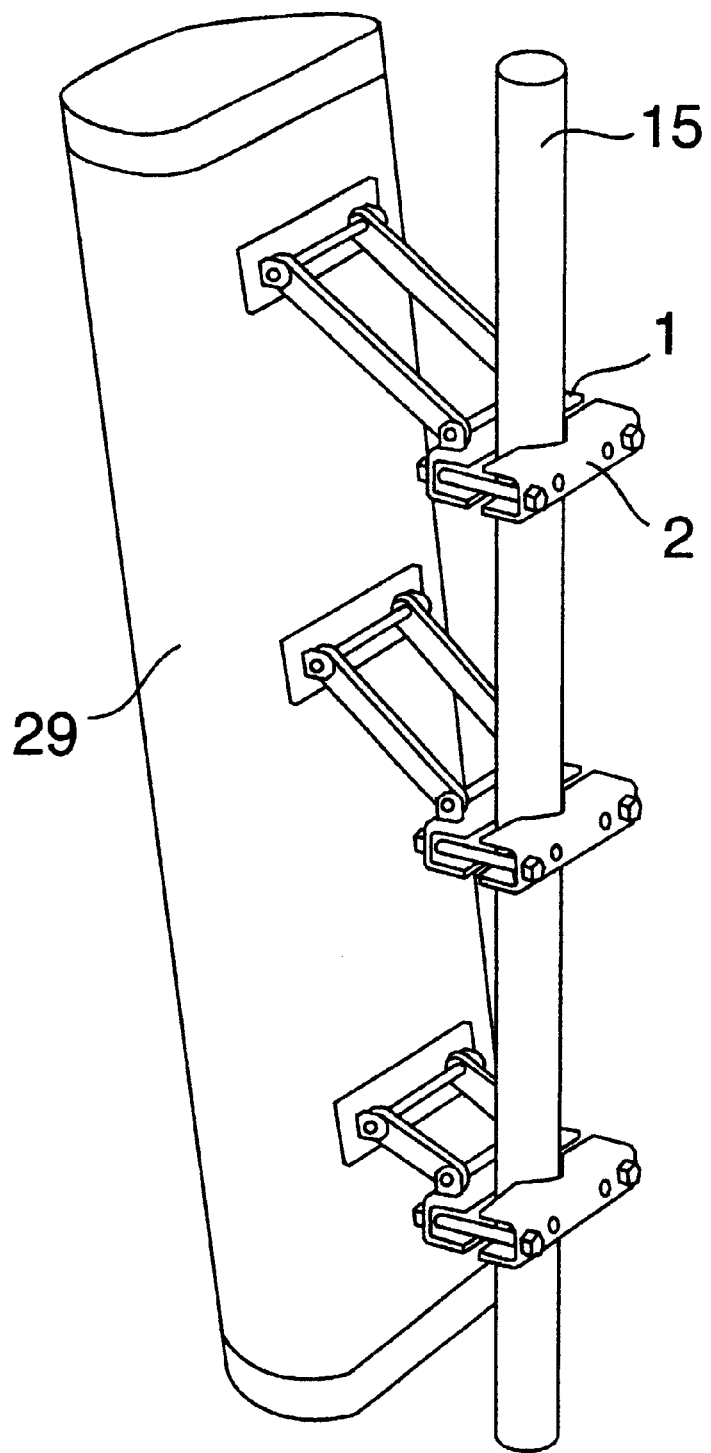
FIG. 9 an antenna mounted with prior art mounting brackets is shown.

FIG. 9 illustrates an antenna 29 mounted on a pole 15 by means of prior art mounting brackets 1, 2. The mounting bracket according to the invention is used in a similar way, when used on a pole, or similar. It is evident that the mounting of an antenna, when using a mounting bracket according to the invention, which can be pre-assembled so that no loose parts have to be added during the mounting on the pole, is much simpler then when using a prior art mounting bracket with numerous loose parts to be added during the mounting on the pole.

REFERENCE NUMERALS 1 base clamp
2 tightening clamp
3 screw, bolt
4 bore
5 bore
6 nut
7 lug
8 square bore
9 square portion
10 carriage bolt
11 bore
12 slot
13 slot
14 groove
15 pole
16 screw
17 nut
18 arm, locking member
19 slot
20 screw
21 nut
22 screw
23 nut
24 wall
25 scale
26 edge
27 hole
28 hole
29 antenna

What is claimed is:

1. A mounting bracket for securing an object to a bar member, said mounting bracket comprising:

a first clamp part adapted to carry said object, a second clamp part, said first and second clamp parts together being clampable about said bar member by first and second clamp screws extending between said first and second clamp parts at sides of said bar member, each of said clamp parts having a substantially U-shaped cross section including a web portion and two leg portions extending therefrom and having parallel edges, each of said edges having recessed edge portions adapted to contact and partly embrace said bar member, said clamp screws being secured to said first clamp part at a defined distance from each other to extend substantially perpendicularly therefrom towards said second clamp part, said second clamp part having first and second elongate slots for receiving said clamp screws, said first slot having a closed end towards a first end of said second clamp and said second slot having an open end at a second end of said second clamp part, said second slot having an extension being at least twice the diameter of said clamp screws, and said first slot having an extension being at least one diameter of said clamp screws longer than said second slot, whereby one of said clamp screws is positioned at one end of said first slot with the other of said clamp screws positioned at one end of said second slot in a first position and the one clamp screw being positioned at an opposite end of said first slot with the other clamp screw passing through said open end of said second slot in a second position to facilitate placement of said second clamp part around said bar member, and at least one of said clamp screws being fixedly secured to said first clamp part to prohibit rotational and axial movement.

2. The mounting bracket according to claim 1, wherein a distance between said closed end of said first slot and inner closed end of said second slot is substantially equal to said defined distance.

3. The mounting bracket according to claim 1, wherein said clamp screws are permanently secured to said first clamp part.

4. The mounting bracket according to claim 1, wherein one of said leg portions of said first clamp part is provided with means for attaching said object.

5. The mounting bracket according to claim 1, wherein a distance between said closed end of said first slot and inner closed end of said second slot is less than a distance between said clamp screws.

6. A mounting bracket for securing an object to a bar member, said mounting bracket comprising:

a first clamp part adapted to carry said object, a second clamp part, each of said first and second clamp parts being adapted to partly embrace said bar member, and both said clamp parts together being clampable about said bar member by first and second clamp screws engageable with said first and second clamp parts at sides of said bar member, each of said clamp parts having a substantially U-shaped cross section including a web portion and two leg portions extending therefrom and having parallel edges, each of said edges having recessed edge portions adapted to contact and partly embrace said bar member, said first clamp part having apertures for said clamp screws located at a defined distance from each other and being shaped to engage said clamp screws when extending therethrough, said leg portions of said first and second clamp parts being provided with holes locatable in an aligned relationship for receiving therethrough a member defining a common axis of said first and second clamp parts for relative pivotal rotation therebetween, said web portion of said first clamp part being wider than said web portion of said second clamp part, whereby said leg portions of said first clamp part are capable of straddling said leg portions of said second clamp part.

7. The mounting bracket according to claim 6, wherein a distance between said closed end of said first slot and inner closed end of said second slot is substantially equal to said defined distance.

8. The mounting bracket according to claim 6, wherein at least one of said clamp screws is fixedly secured to said first clamp part.

9. The mounting bracket according to claim 6, wherein said clamp screws are permanently secured to said first clamp part.

10. The mounting bracket according to claim 6, wherein one of said leg portions of said first clamp part is provided with means for attaching said object.

11. The mounting bracket according to claim 6, wherein a distance between said closed end of said first slot and inner closed end of said second slot is less than a distance between said clamp screws.

12. The mounting bracket according to claim 6, wherein each of said first and second clamp parts is provided with respective means for connecting thereto opposite ends of an elongate arm member restricting said relative rotation.

13. The mounting bracket according to claim 6, wherein one of said first and second clamp parts is provided with a scale indicating an angle of relative rotation around said common axis.

14. The mounting bracket according to claim 13, wherein an edge of the other of said first and second clamp parts constitutes a pointer for said scale.

* * * * *